June 4, 1940.　　　A. M. CAMERON　　　2,203,403
LOCK SEAM SOLDERING ATTACHMENT
Filed May 20, 1937　　　5 Sheets-Sheet 1
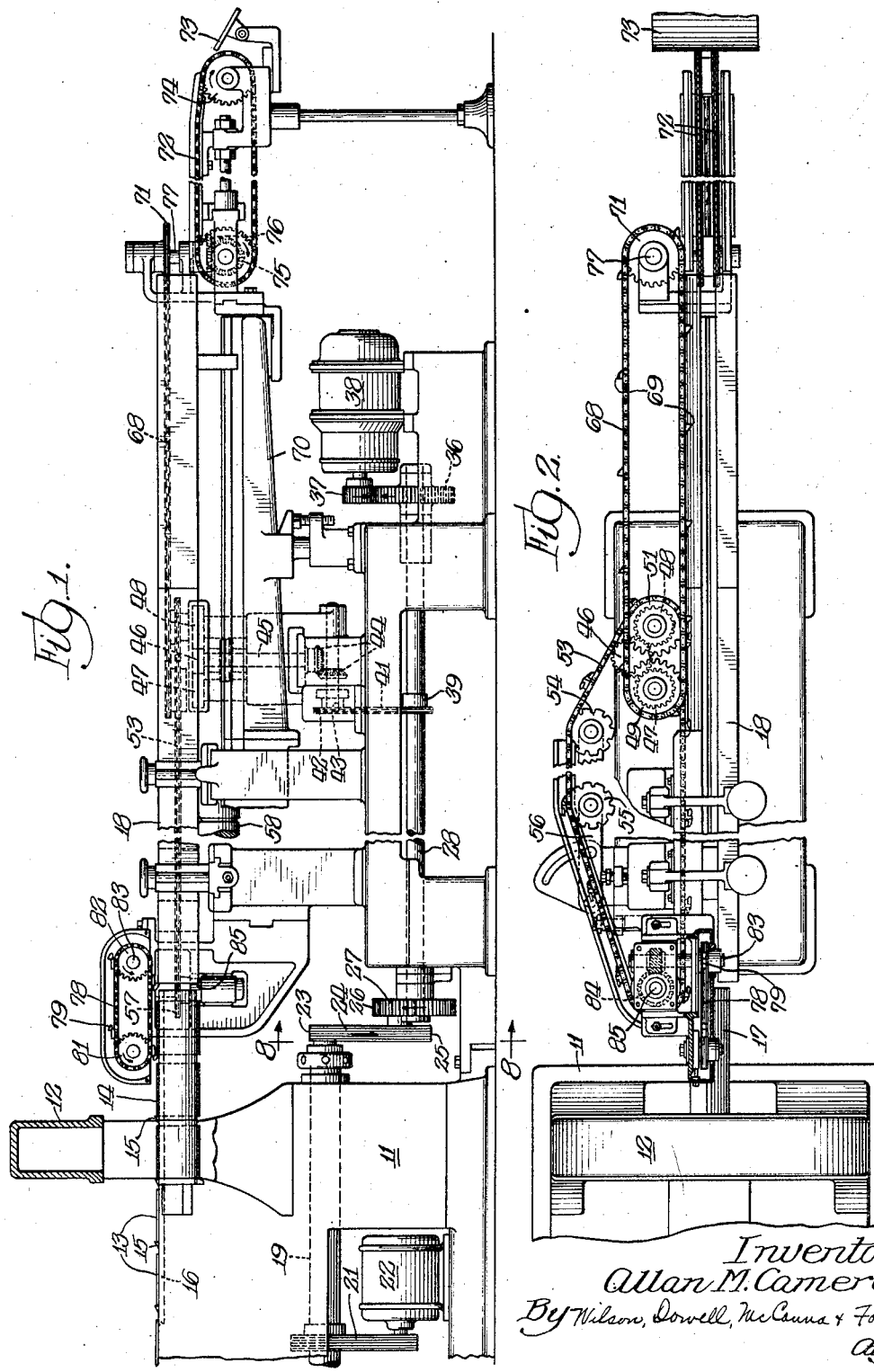
Inventor:-
Allan M. Cameron,
By Wilson, Dowell, McCanna & Foley
Attys.

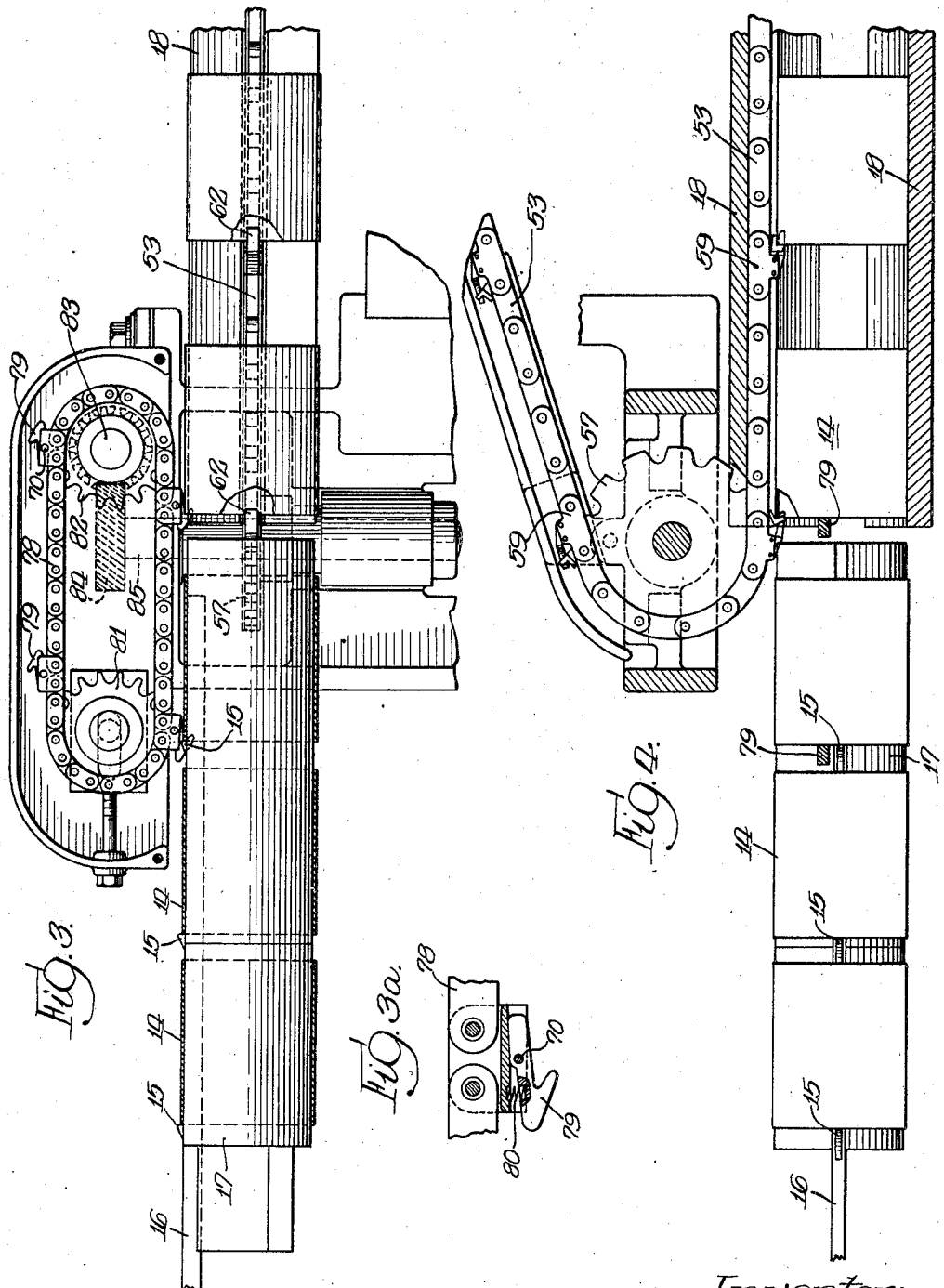

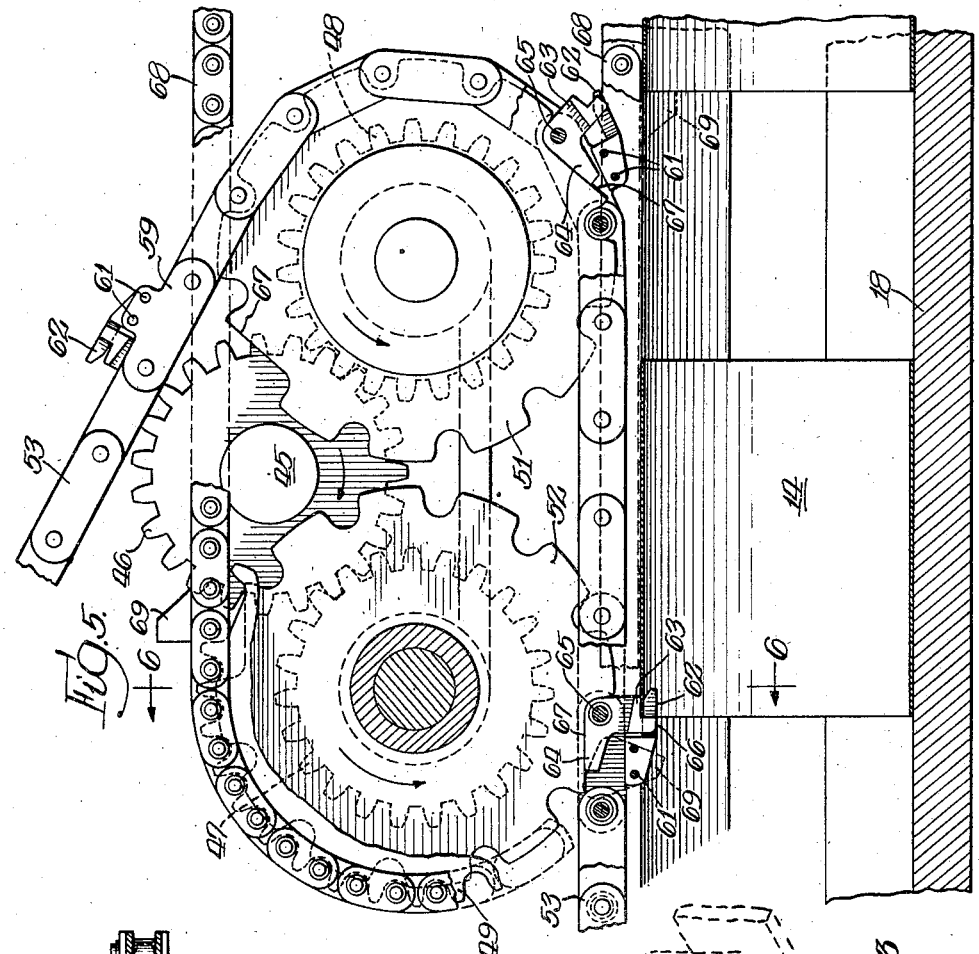
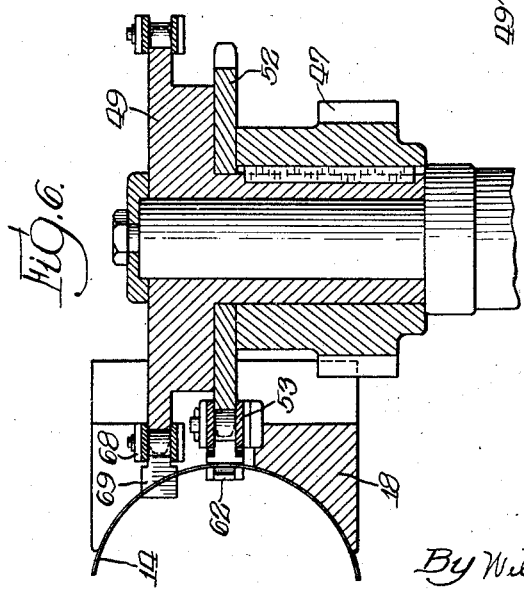
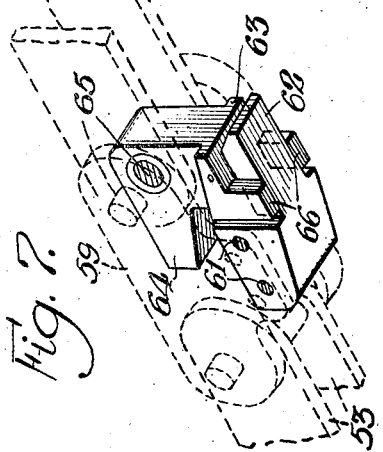

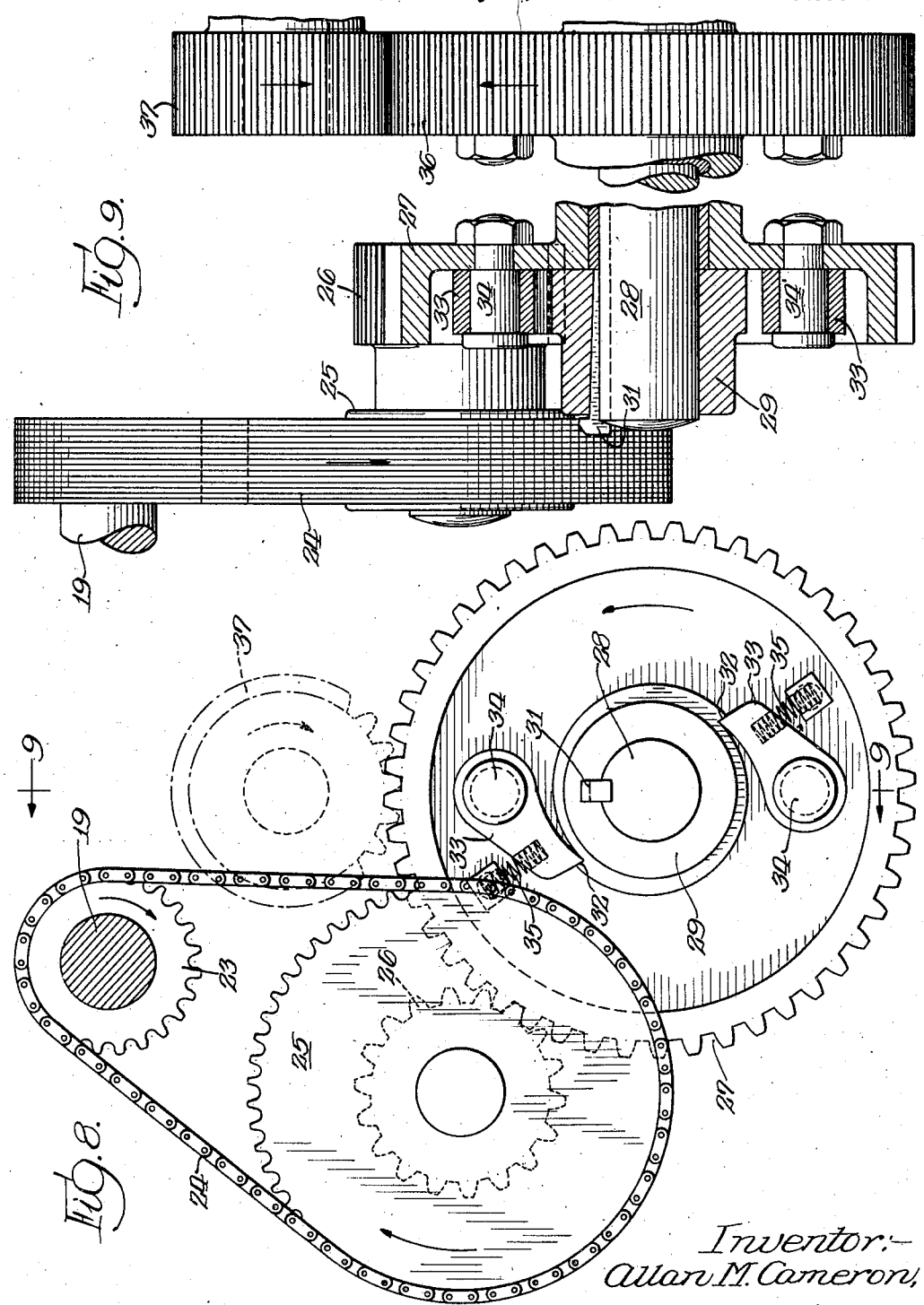

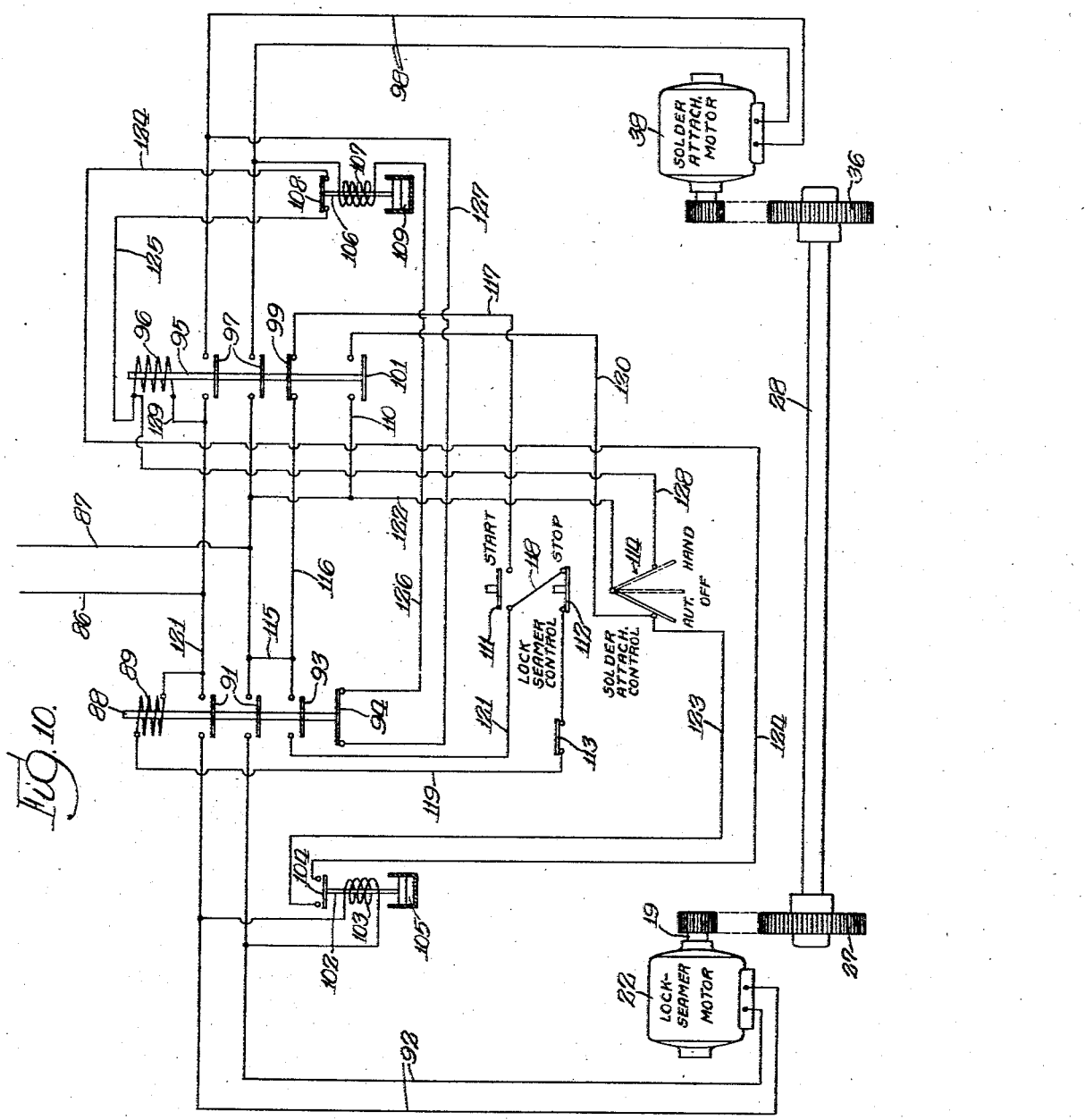

Patented June 4, 1940

2,203,403

UNITED STATES PATENT OFFICE 2,203,403

LOCK SEAM SOLDERING ATTACHMENT

Allan M. Cameron, Oak Park, Ill., assignor to Cameron Can Machinery Co., Chicago, Ill., a corporation of Illinois Application May 20, 1937, Serial No. 143,715

9 Claims. (Cl. 113—9)

This invention relates in general to can making machinery and more particularly to the mechanism for soldering the side seams of the can bodies which are formed and delivered by the lock seamer. Such soldering mechanism, which is really a machine in and of itself to which the formed bodies are delivered by the body maker, is commercially known as a soldering attachment and will be so designated herein. The two-motor drive for the lock seamer and soldering attachment and the control therefor which is herein illustrated and described form the subject matter of a divisional application Serial No. 170,197, filed October 21, 1937.

Difficulty has heretofore been encountered in the transfer of the can bodies from the lock seamer to the soldering attachment, particularly when starting up the machine. The can bodies are delivered from the lock seamer by reciprocatory feed dogs and are picked up in the soldering attachment and are advanced through the soldering attachment by a chain feed. The transition from an intermittent to a continuous feed involves difficulties unless the parts are accurately synchronized. Furthermore, if the lock seamer comes to rest with the last can body in the machine partially but not fully advanced, the side of the body instead of the rear edge will be presented in the path of a chain feed dog of the soldering attachment with resultant damage to the body and sometimes injury to the machine. My present invention obviates this possibility by providing a transfer device between the lock seamer and the feed chain of the soldering attachment which transfers the bodies from the lock seamer to the soldering attachment feed chain in proper timed relation to the chain, and if the last body be in only partially advanced position the transfer dogs will slide idly past the body without injury to either the body or the machine.

One feature of my invention resides in the construction of the chain feed dogs of the soldering attachment which function not only to advance the can bodies past the soldering device but also to grip and hold the bodies against rotation to insure that the solder will be applied to the side seam and not to an area of the body at one side of the seam.

Another feature resides in the manner of releasing these chain feed dogs from the bodies without injuring or marring the bodies and in the mechanism for conveying the bodies past the cooling air blast and discharging them from the machine.

Other objects and many of the inherent advantages of my invention will be appreciated as the same becomes better understood by reference to the following description when considered in connection with the accompanying drawings.

Referring to the drawings:

Fig. 1 is a side elevation of a portion of the lock seamer and a soldering attachment constructed in accordance with the principles of my invention;

Fig. 2 is a plan view of the apparatus shown in Fig. 1;

Fig. 3 is an enlarged fragmentary elevational view showing the transfer mechanism by which the bodies are transferred from the lock seamer horn to the conveyor chain of the soldering attachment;

Fig. 3ᵃ is a fragmentary view of one of the yielding transfer dogs;

Fig. 4 is a fragmentary plan of the mechanism shown in Fig. 3;

Fig. 5 is an enlarged fragmentary view showing the operation of one of the clamping chain dogs and the release of a can body therefrom by the discharge chain;

Fig. 6 is a sectional view on the line 6—6 of Fig. 5;

Fig. 7 is a bottom view looking upwardly at the left hand clamping dog of Fig. 5;

Fig. 8 is an enlarged detail view taken on the line 8—8 of Fig. 1;

Fig. 9 is a view partially in section on the line 9—9 of Fig. 8; and

Fig. 10 is a diagrammatic layout of the motor control circuits.

Referring to the drawings more in detail, reference character 11 (Figs. 1 and 2) indicates generally the rear portion of a lock seam body maker, the arch 12 of which carries the forming wings and bumping mechanism by which the side seams of the can bodies are locked and bumped. These mechanisms are of well-known construction and their illustration here is deemed unnecessary. It may be stated, however, that the body blanks 13 which have been edged and notched by suitable mechanisms are fed to the forming station and the cylindrical bodies 14 formed from these blanks are fed from the forming station by feed dogs 15 carried by a reciprocatory feed bar 16 in the usual manner. The bodies are discharged from the forming station along an internal horn 17 and in the soldering attachment are conveyed past the soldering mechanism through an external horn 18.

The various mechanisms of the lock seamer are operated from a main shaft 19 which is driven through a chain or belt drive 21 from a motor 22 which will hereafter be referred to as the main motor. The shaft 19 projects at the rear end of the lock seamer where, as shown in Figs. 8 and 9, it is provided with a sprocket wheel 23 which is connected through a chain drive 24 with a sprocket wheel 25, the hub of which is provided with a pinion 26 meshing with a gear wheel 27 forming the drive member of an overrunning drive clutch. This gear wheel is freely rotatable upon the main shaft 28 of the soldering attachment and surrounds a hub 29 secured by a key 31 or otherwise to this shaft. The hub is provided with two or more peripheral teeth 32 adapted to be engaged and driven by companion dogs 33 pivotally carried by the gear 27 upon stud bolts 34 and urged into cooperative relation with the teeth 33 by expansion springs 35. The main motor 22, therefore, serves not only to operate the lock seamer but also to operate the various mechanisms of the soldering attachment through the shaft 28 and the overrunning drive clutch between the shafts 19 and 28. It will be apparent, therefore, that through this drive connection the soldering attachment is operated in timed and synchronized relation with the lock seamer so that the can bodies delivered by the lock seamer are picked up and carried through the soldering attachment without interruption of the timing.

The opposite end of the shaft 28 is provided with a similar overrunning drive clutch housed within a drive gear 36 (Fig. 9). The details of this second drive clutch being substantially identical with the one just described, detailed description and illustration thereof is unnecessary for its understanding. The gear 36 meshes with and is driven by a pinion 37 mounted on the shaft of a second motor 38 which will be referred to hereafter as the auxiliary motor. This is a smaller motor than the main motor 22 and is designed to operate at a slower speed so that when the motor 22 is operating to drive the shaft 28 the motor 38 simply idles as the teeth of its overrunning drive clutch pass beneath the spring pressed dogs housed in the gear wheel 36. When, however, the main motor is stopped the shaft 28, as its speed drops to that of the gear 36, is picked up by the clutch dogs carried by this gear and driven by the auxiliary motor 38 so as to continue the operation of the soldering attachment until the can bodies have been cleared therefrom. During the operation of the soldering attachment by the motor 38, the drive teeth 32 of the overdrive clutch housed in the gear 27 pass beneath the drive dogs 33 which, when the motor 22 is at rest, remain stationary.

The various mechanisms of the soldering attachment are driven from the shaft 28 in the following manner. A driving sprocket wheel 39 fixed upon shaft 38 is connected by a drive chain 41 with a sprocket wheel 42 carried by a short countershaft 43 which through bevelled pinions 44 drives a vertical shaft 45 equipped at its upper end with a pinion 46 (Figs. 2 and 5). This pinion drives two gear wheels 47 and 48 rigidly connected respectively with sprocket wheels 49 and 51 so that these wheels are thereby driven in the same direction. An idler sprocket wheel 52 is mounted on the hub of the sprocket wheel 49 above the gear wheel 47, as will be apparent from Fig. 6, to assist in guiding the feed chain 53 which is trained over the sprocket wheel 51, over a second idler 54, a tension idler 55 carried by an adjustable arm 56 and around another sprocket wheel 57 near the forward end of the soldering attachment.

The feed chain 53, as will be apparent from Figs. 4 and 6, travels in a groove in one side of the external horn 18 and carries a series of feed dogs by which the can bodies are fed along the horn over the soldering roll 58 by which solder is applied to the previously locked side seams of the bodies. In order to hold the bodies against rotative movement which would dispose the side seams out of alignment with the solder roll, the feed dogs carried by the chain 53 are constructed to clampingly engage the can bodies and hold them against rotative movement while in transit over the solder roll. The construction of these feed dogs will be apparent from Figs. 4 to 7, inclusive, referring to which it will be observed that at spaced intervals the chain 53 embodies dog carrying links 59 between each pair of which is secured by rivets 61 or otherwise a forwardly projecting finger 62 adapted to enter the rear end of a can body within the horn. A bell-crank-shaped clamping dog comprising a clamping portion 63 and a tail portion 64 is pivoted upon the link connecting pin 65 at the forward end of this link. This dog has two spaced apart extensions 66 straddling the finger 62 whereby the finger and dog are maintained in accurate alignment. These extensions also provide an abutment adapted to engage the rear edge of a can body as the chain moves forward and thereby cause the clamping member to swing on its pivot pin support to bring the clamping portion 63 into clamping relation with the finger 62, thereby securely clamping the can body so as to preclude any rotative movement thereof. The clamping position of one of the holding feed dogs is shown in Fig. 5 where one of the dogs is shown as clampingly engaging one of the can bodies 14.

For the purpose of releasing the clamping dog to free a can body therefrom, the sprocket wheel 51 is provided at the requisite predetermined intervals with a flat face 67 adapted, as the feed chain 53 passes around this wheel, to engage the tail 64 of the clamping member and swing it from the clamping position shown at the left in Fig. 5 to the release position shown at the right in Fig. 5. In this manner the can bodies are clamped and held against rotation during their advance past the soldering roll by the feed chain 53 and are positively released for further advance through the machine as they reach the delivery end of the path of travel of the chain 53.

To further insure disengagement of the can bodies from the clamping feed dogs and to prevent the fingers 62 from bending or marring the edges of the bodies as the fingers move away from the bodies around the sprocket wheel 51, I have provided a discharge feed chain 68 equipped with flat-faced feed dogs 69, which chain is trained at one end over the driving sprocket wheel 49 and at its other end over a sprocket wheel 71. This chain, due to the fact that the gear 47 is slightly smaller than the gear 48, travels at a slightly higher rate of speed than the feed chain 53. The two chains are so timed that as a clamping dog on the chain 53 approaches the sprocket wheel 51 a dog 69 on the chain 68 overtakes the can body and urges it forward at a higher speed, thereby withdrawing it from the clamping dog so that at the point where the clamping dog changes its straight line path of movement to an arcuate movement around the sprocket wheel 51, the can body has been completely freed from engagement with the dog, as illustrated at the right in Fig. 5.

During the travel of the can bodies under the influence of the feed chain 68, they are subjected to a blast of cooling air delivered upwardly from an elongated perforated nozzle or pipe 70 in a well-known manner by mechanism not shown which insures the setting of the solder. At the discharge end of the feed chain 68 the bodies are taken by a belt or chain conveyor 72 and delivered to a discharge chute or runway 73. The conveyor 72 is trained over a sprocket wheel 74 and over a driving sprocket wheel 75 which is driven through a pair of bevel gears 76 from the shaft 71 carrying the sprocket wheel 71.

To insure the transfer of the can bodies from the lock seamer to the feed chain 53 of the soldering attachment without possibility of injury to the bodies or to the machine, particularly in instances where the lock seamer might, when stopped, leave the last body in a partially advanced position, I have provided a transfer device illustrated most clearly in Fig. 3. This device consists of a short transfer chain 78 trained over an adjustable idler sprocket 81 and a companion driving sprocket 82 mounted upon the outer end of a shaft 83 (Fig. 2) which is driven through a worm drive 84 from the shaft 85 upon which the sprocket wheel 57 of the feed chain 53 is fixedly mounted.

This transfer chain carries a plurality of feed dogs 79, each of which, as shown in Fig. 3ª, is pivoted on a pin 70 and is urged into operative feeding position by a spring 80. The projecting portion of each dog is undercut, as shown, to ensure feeding engagement with the rear end of a properly positioned body as illustrated in Fig. 3.

If, however, a body should come to rest in a partially advanced position when the feed bar 16 stops, a feed dog 79 would then be brought against the side instead of the rear edge of the body. In such event the spring 80 will yield, permitting the dog to slide idly along the exterior of the body without injury to either such body or to the machine. When the lock seamer is again started the feed bar will advance the body to proper position to be picked up by a transfer dog and transferred in proper timed relation to be engaged and advanced by a clamping dog of the feed chain 53.

It will be apparent from the foregoing that I have made provision for positive and accurate transfer of the can bodies from the lock seamer to the clamping feed dogs of the soldering attachment by which the bodies are clamped and held against rotative movement during the application of the solder thereto and from which the bodies are positively withdrawn to preclude injury to the bodies as the clamping dogs recede from the path of travel of the bodies. After being withdrawn from the clamping dogs, the bodies are fed past the cooling device and are finally discharged at the delivery end of the soldering attachment.

It has previously been explained how during normal operation the soldering attachment as well as the lock seamer are driven from the main motor 22 and how, upon stoppage of this motor and the lock seamer, the driving of the soldering attachment shaft 28 is picked up by the auxiliary motor 38 by which the operation of the soldering attachment is continued until the can bodies are cleared therefrom. The switch from one to the other of these sources of power is made possible by the overrunning drive clutches carried by the gear wheels 27 and 36, as heretofore explained.

My invention embodies also a control system for these motors by which the main motor is first started to set the lock seamer and the soldering attachment into operation; then the auxiliary motor is started which operates at a slower speed than the main motor and, therefore, because of the overrunning drive clutch in the gear 36, simply idles during normal operation of the machines. When, however, the main motor is stopped for any reason, thus stopping the lock seamer, the auxiliary motor continues the operation of the soldering attachment at a slower speed until the can bodies are freed therefrom, whereupon the auxiliary motor also stops. The control system is also designed to enable the auxiliary motor to operate the soldering attachment under manual control whenever desired, but in that instance the main motor is locked out of operation.

The control system by which the motors are controlled to operate in the manner above indicated is illustrated in Fig. 10 to which reference is now made. Current for the motors and the control circuits is supplied by the power leads 86 and 87. A core 88 of a solenoid 89 carries the switch 91 which connects the power leads with the main motor circuit 92 and carries also the switches 93 and 94. The core 95 of a solenoid 96 carries the switch 97 which connects the power leads with the auxiliary motor circuit 98 and also carries the switches 99 and 101. The core 102 of a timing solenoid 103 carries a switch 104 and the action of this solenoid is delayed by a dashpot device 105 of well-known construction. The core 106 of a solenoid 107 carries a switch 108 and the operation of this solenoid is also delayed by a similar dashpot device 109. The normally open starting switch is designated by 111, the normally closed stopping switch by 112, and one of several emergency stop switches with which the lock seamer is equipped for the purpose of stopping the lock seamer upon the occurrence of a jam or other defect in operation is indicated by 113. A hand controlled switch diagrammatically illustrated is indicated by 114. In the position in which the parts are shown on the drawings, the circuits are open, the motors are at rest, and the solenoids are deenergized.

To start the machine the starting button is depressed, momentarily closing the switch 111 which initiates a current flow from power lead 87 through lines 115, 116 to the switch 99 to the line 117, switch 111, line 118, normally closed stopping switch 112, line 119, solenoid coil 89 and line 121 to lead 86. Energization of solenoid 89 closes switch 91, causing delivery of power current through circuit 92 to the main motor 22 which is thereby set in operation. Simultaneously switch 93 is closed thereby maintaining energization of solenoid 89 through switch 93, line 121 and lines 118 and 119. This circuit replaces the energizing circuit momentarily established by the temporary closing of the starting switch 111.

Current in the circuit 92 is shunted through solenoid 103 and after a predetermined time interval determined by the setting of the dashpot device 105, the switch 104 is closed. Assuming that the control device 114 is in the full line position shown and indicated as "AUT," circuit is now established from lead 87 through line 122, control device 114, line 123, switch 104, line 124, switch 108, line 125, solenoid coil 96 and line 121 to lead 86. Energization of solenoid 96 closes switch 97, thereby delivering current to circuit 98 which starts auxiliary motor 38. Switch 99 is simultaneously opened, thereby rendering accidental operation of starting switch 11 ineffective. Both motors will now continue to operate main motor 22 driving the lock seamer and the soldering attachment and auxiliary motor 38 running idle. Should the control lever 114, either accidentally or otherwise, be thrown to "off" position, the auxiliary motor would not be stopped because the circuit energizing its starting solenoid 96 would then be closed through the alternative circuit comprising line 110, switch 101 and line 120.

Assume now that one of the emergency switches 113 or the manual stop switch 112 is opened for the purpose of stopping the lock seamer. The energizing circuit for the solenoid 89 is thereby broken and the switches carried by the core 88 will reassume the position shown on the drawings. This will break the circuit 92 stopping the main motor, will open switch 93 and will close the switch 94. The closing of this switch will establish a circuit through solenoid 107, line 126, switch 94 and line 127, thereby energizing this solenoid and causing the opening of switch 108 after a delayed time interval determined by the setting of the dashpot device 109. During this delayed time interval, the auxiliary motor 38 will pick up and continue to operate the shaft 28, thereby operating the soldering attachment to clear the can bodies therefrom. The dashpot device 109 is so set that the opening of switch 108 will be delayed sufficiently to permit the clearance of all the can bodies from the soldering attachment before the switch is opened. Upon opening of switch 108, the circuit through solenoid 96 is broken, permitting the switches carried by the core 95 to reassume the position shown on the drawings, thereby opening the auxiliary motor circuit 98 and causing this motor to stop. All of the parts are now in their original position and the operation may be repeated by simply closing the starting switch 111 whenever desired.

Should it be desired to operate the lock seamer for test purposes, for instance, without operating the soldering attachment, this may be done by first throwing the control 114 to "off" or central position indicated on the drawings. The motor 22 may then be started by manipulation of the starting switch 111, as previously explained, but the closing of switch 104 will not cause the energization of solenoid 96 to start motor 38 because the connection between lines 122 and 123 is broken at 114. The lock seamer may, therefore, be operated independently of the soldering attachment.

Should it be desirable to operate the soldering attachment for test purposes or otherwise without operating the lock seamer, this result may be accomplished by throwing the control lever 114 into its right-hand position upon the drawings indicated as "Hand." A circuit for direct energization of solenoid 96 is thereby established through line 122, control 114, line 128 and the connecting line 129 between the solenoid and line 121. The resultant actuation of solenoid 117 to open switch 108 will not, however, serve to deenergize solenoid 96 and stop auxiliary motor 38 because said solenoid is now energized through an independent circuit including the hand control 114.

It will be apparent from the foregoing that I have provided a control for the lock seamer and soldering attachment will will enable either machine to be operated independently of the other for test or other purposes and by which normally both the lock seamer and the soldering attachment are operated in synchronism from the main motor; but in the event of stoppage of the main motor, the soldering attachment will be continued in operation by the auxiliary motor until the can bodies are cleared from the soldering attachment.

The operation of the machine as a whole and of its component parts has been explained in connection with the description; therefore further statement of operation would be superfluous. The structural details illustrated and described may obviously be varied within considerable limits without departing from the essentials of my invention as defined in the following claims.

I claim:

1. The combination of a lock seamer including reciprocatory feed dogs for delivering can bodies from the forming mechanism, a soldering attachment including a continuously operating feed chain provided with can body engaging dogs for advancing can bodies through the soldering attachment, and means for transferring can bodies from the lock seamer to said feed chain in predetermined relation to the feed chain dogs, said means comprising a continuously operating transfer chain positioned to overlap a portion of the path of travel of the last reciprocatory feed dog in the lock seamer and yielding feed dogs carried by said transfer chain adapted to slide idly over a body partially advanced by said reciprocatory dog and to engage and deliver a fully advanced body to said feed chain of the soldering attachment.

2. The combination with a soldering attachment for soldering can bodies formed by a lock seamer, of means for transferring formed bodies from the lock seamer to the feed mechanism of the soldering attachment, said means including a continuously operating transfer chain provided with yielding feed dogs positioned to remove can bodies from a lock seamer and deliver the same into cooperative relation with the feed mechanism of the soldering attachment.

3. The combination with a soldering attachment including a continuously operating feed chain for advancing can bodies along the attachment, of transfer mechanism for transferring bodies from a lock seamer to said feed chain, said mechanism overlapping the lock seamer to positively withdraw fully advanced can bodies therefrom and transfer the same to said feed chain and to pass over partially advanced bodies without injury to such bodies, said transfer mechanism and said feed chain being so relatively timed that each transferred can body is positioned to be picked up by the feed chain without cessation of movement of the can body.

4. In a can body soldering attachment, the combination of a hollow horn through which the can bodies are advanced, a soldering roll for applying solder to the advancing bodies, means for cooling the soldered bodies, transfer mechanism for transferring bodies from a lock seamer to the soldering attachment, feed mechanism operating at a higher linear speed than the transfer mechanism for removing the bodies from the transfer mechanism, said feed mechanism including clamping dogs for clamping the can bodies to prevent rotation thereof during the application of solder thereto, a feed chain overlapping said feed mechanism and operating at a higher linear speed than the feed mechanism for removing can bodies from said clamping dogs and advancing the same in cooperative relation to said cooling device, and a conveyor for receiving the can bodies from said feed chain and discharging the same from the machine.

5. In a can body soldering attachment, the combination of a transfer device for transferring can bodies from a lock seamer to the soldering attachment, a feed chain overlapping the transfer device and operating at a higher speed than the transfer device by which can bodies are removed from the transfer device and advanced past the soldering station, a second feed chain overlapping said first feed chain and operating at a higher linear speed than said first feed chain for removing can bodies from said first feed chain and conveying the same past a cooling station, and means for discharging can bodies delivered by said last mentioned feed chain.

6. The combination with a lock seamer and a soldering attachment including a feed chain having clamping dogs to prevent rotation of can bodies during advance thereof by said feed chain, of means for transferring can bodies from the lock seamer to said feed chain, said means including yielding feed dogs adapted to positively advance a properly positioned body and to contact and pass an improperly positioned body.

7. The combination with a lock seamer and a soldering attachment including a feed chain having clamping dogs to prevent rotation of can bodies during advance thereof by said feed chain, of an endless chain equipped with yielding feed dogs whose path of travel overlaps the lock seamer and the feed chain, said dogs being adapted to yield and pass a partially advanced body and to engage and deliver from the lock seamer to the feed chain a fully advanced body.

8. A soldering attachment comprising a feed chain including a link provided with a rigid finger adapted to enter the open end of a can body, a pivotally mounted clamping member cooperable with said finger and including an abutment adapted to be engaged by the edge of a can body for moving said member into clamping relation with said finger, sprocket wheels around which said feed chain is trained, one at least of said sprocket wheels being provided with a thrust face adapted to positively actuate said clamping member to release the clamped body at a predetermined position of the wheel, and a transfer mechanism operating in timed relation with said feed chain to transfer a can body from a lock seamer into position to be engaged by said finger and clamping member.

9. The combination with a lock seamer and a soldering attachment including a feed chain provided with feed dogs, of means for transferring can bodies from the lock seamer to said feed chain, said means including yielding feed dogs arranged to overlap in their travel the feed mechanism of the lock seamer and adapted to positively advance a properly positioned body and to yieldingly contact and pass an improperly positioned body.

ALLAN M. CAMERON.